United States Patent
He et al.

(10) Patent No.: US 12,244,547 B2
(45) Date of Patent: Mar. 4, 2025

(54) HALF DUPLEX FREQUENCY DIVISION DUPLEX FOR NEW RADIO

(71) Applicant: Apple Inc., Cupertino, CA (US)

(72) Inventors: Hong He, San Jose, CA (US);
Chunxuan Ye, San Diego, CA (US);
Dawei Zhang, Saratoga, CA (US);
Haitong Sun, Cupertino, CA (US);
Huaning Niu, San Jose, CA (US); Jie Cui, San Jose, CA (US); Oghenekome Oteri, San Diego, CA (US); Seyed Ali Akbar Fakoorian, San Diego, CA (US); Wei Zeng, Saratoga, CA (US);
Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 599 days.

(21) Appl. No.: 17/593,331

(22) PCT Filed: Jan. 14, 2021

(86) PCT No.: PCT/CN2021/071907
§ 371 (c)(1),
(2) Date: Sep. 15, 2021

(87) PCT Pub. No.: WO2022/151253
PCT Pub. Date: Jul. 21, 2022

(65) Prior Publication Data
US 2023/0179391 A1    Jun. 8, 2023

(51) Int. Cl.
*H04L 27/26*    (2006.01)
*H04L 5/16*    (2006.01)
(Continued)

(52) U.S. Cl.
CPC ............ *H04L 5/16* (2013.01); *H04L 27/2666* (2013.01); *H04W 28/0284* (2013.01);
(Continued)

(58) Field of Classification Search
CPC . H04W 24/08; H04W 52/14; H04W 74/0833; H04L 5/16; H04L 27/2666; H04L 12/413
See application file for complete search history.

(56) References Cited

U.S. PATENT DOCUMENTS

2015/0327196 A1*  11/2015  Blankenship ..... H04W 56/0045
                                                           370/281
2016/0081110 A1    3/2016  Suzuki et al.
(Continued)

FOREIGN PATENT DOCUMENTS

CN    103248598    8/2013
CN    105794287    7/2016
(Continued)

OTHER PUBLICATIONS

3GPP, "TS 36.306 version 15.4.0", May 2019, pp. 1-120 (Year: 2019).*

(Continued)

*Primary Examiner* — Salvador E Rivas
(74) *Attorney, Agent, or Firm* — Fay Kaplun & Marcin, LLP

(57) ABSTRACT

A user equipment (UE) is configured for half-duplex operations with a network. The UE determines that half-duplex (HD) frequency division duplex (FDD) is enabled by a network with which the UE is communicating, wherein a guard period is configured for downlink and uplink switching when the HD FDD is enabled, performs a first uplink transmission at a first time and performs a first downlink reception at a second time, wherein the guard period represents a time duration between the first time and the second time during which the UE is not to perform a second different uplink transmission or a second different downlink reception.

18 Claims, 8 Drawing Sheets

(51) Int. Cl.
*H04W 28/02* (2009.01)
*H04W 52/14* (2009.01)
*H04L 12/413* (2006.01)
*H04W 74/0833* (2024.01)

(52) U.S. Cl.
CPC ....... *H04W 28/0289* (2013.01); *H04W 52/14* (2013.01); *H04L 12/413* (2013.01); *H04W 74/0833* (2013.01)

(56) References Cited

U.S. PATENT DOCUMENTS

| | | | |
|---|---|---|---|
| 2016/0308660 A1* | 10/2016 | Cui | H04L 5/003 |
| 2017/0005741 A1* | 1/2017 | Wu | H04W 24/08 |
| 2018/0007667 A1* | 1/2018 | You | H04L 5/0051 |
| 2019/0123886 A1* | 4/2019 | Toledano | H04W 72/23 |
| 2020/0359458 A1* | 11/2020 | Xiong | H04W 72/0466 |
| 2023/0189221 A1* | 6/2023 | Lei | H04L 5/0092 |
| | | | 370/281 |

FOREIGN PATENT DOCUMENTS

| | | |
|---|---|---|
| CN | 111527786 | 8/2020 |
| WO | 2015/096286 | 7/2015 |

OTHER PUBLICATIONS

Alcatel-Lucent et al., "Considerations on Low Cost MTC HD-FDD", 3GPP TSG RAN WG1 Meeting #77, R1-142037, May 23, 2014, 5 sheets.

\* cited by examiner

HALF DUPLEX FREQUENCY DIVISION DUPLEX FOR NEW RADIO

BACKGROUND

A user equipment (UE) may be equipped with half-duplex (HD) frequency division duplex (FDD) capabilities. When HD FDD is enabled, the UE switches between transmission and reception operations. This is in contrast to full duplex (FD) FDD operations where the UE is configured to handle downlink and uplink transmissions simultaneously. HD FDD operations may provide various benefits to fifth generation (5G) new radio (NR) devices, however, HD FDD is not yet supported by 5G NR.

SUMMARY

Some exemplary embodiments are related to a processor of a user equipment (UE) configured to perform operations. The operations include determining that half-duplex (HD) frequency division duplex (FDD) is enabled by a network with which the UE is communicating, wherein a guard period is configured for downlink and uplink switching when the HD FDD is enabled, performing a first uplink transmission at a first time and performing a first downlink reception at a second time, wherein the guard period represents a time duration between the first time and the second time during which the UE is not to perform a second different uplink transmission or a second different downlink reception.

Other exemplary embodiments are related to a processor of a user equipment (UE) configured to perform operations. The operations include determining that half-duplex (HD) frequency division duplex (FDD) is enabled by a network with which the UE is communicating, identifying a collision between an assigned downlink resource and an assigned uplink resource, determining a type of downlink resource and a type of uplink resource included in the collision and implementing a collision handling mechanism based on the type of downlink resource and the type of uplink resource included in the collision.

Still further exemplary embodiments are related to user equipment (UE) including a transceiver configured to communicate with a) network and a processor communicatively coupled to the transceiver and configured to perform operations. The operations include determining that half-duplex (HD) frequency division duplex (FDD) is enabled by the network with which the UE is communicating, wherein a guard period is configured for downlink and uplink switching when the HD FDD is enabled, performing a first uplink transmission at a first time and performing a first downlink reception at a second time, wherein the guard period represents a time duration between the first time and the second time during which the UE is not to perform a second different uplink transmission or a second different downlink reception.

Additional exemplary embodiments are related to user equipment (UE) including a transceiver configured to communicate with a) network and a processor communicatively coupled to the transceiver and configured to perform operations. The operations include determining that half-duplex (HD) frequency division duplex (FDD) is enabled by the network with which the UE is communicating, identifying a collision between an assigned downlink resource and an assigned uplink resource, determining a type of downlink resource and a type of uplink resource included in the collision and implementing a collision handling mechanism based on the type of downlink resource and the type of uplink resource included in the collision.

Further exemplary embodiments are related to a processor of a base station configured to perform operations. The operations include transmitting a timing advance (TA) configuration to a user equipment (UE), wherein the TA configuration is to be used by the UE to derive a guard period for downlink and uplink switching at the UE, receiving an indication of the guard period from the UE, determining that half-duplex (HD) frequency division duplex (FDD) is enabled at the UE, performing a first uplink reception at a first time and performing a first downlink transmission at a second time wherein the guard period represents a time duration in between the first time and the second time during which the base station is not to perform a second different uplink transmission or a second different downlink transmission.

DETAILED DESCRIPTION

Figure 1:
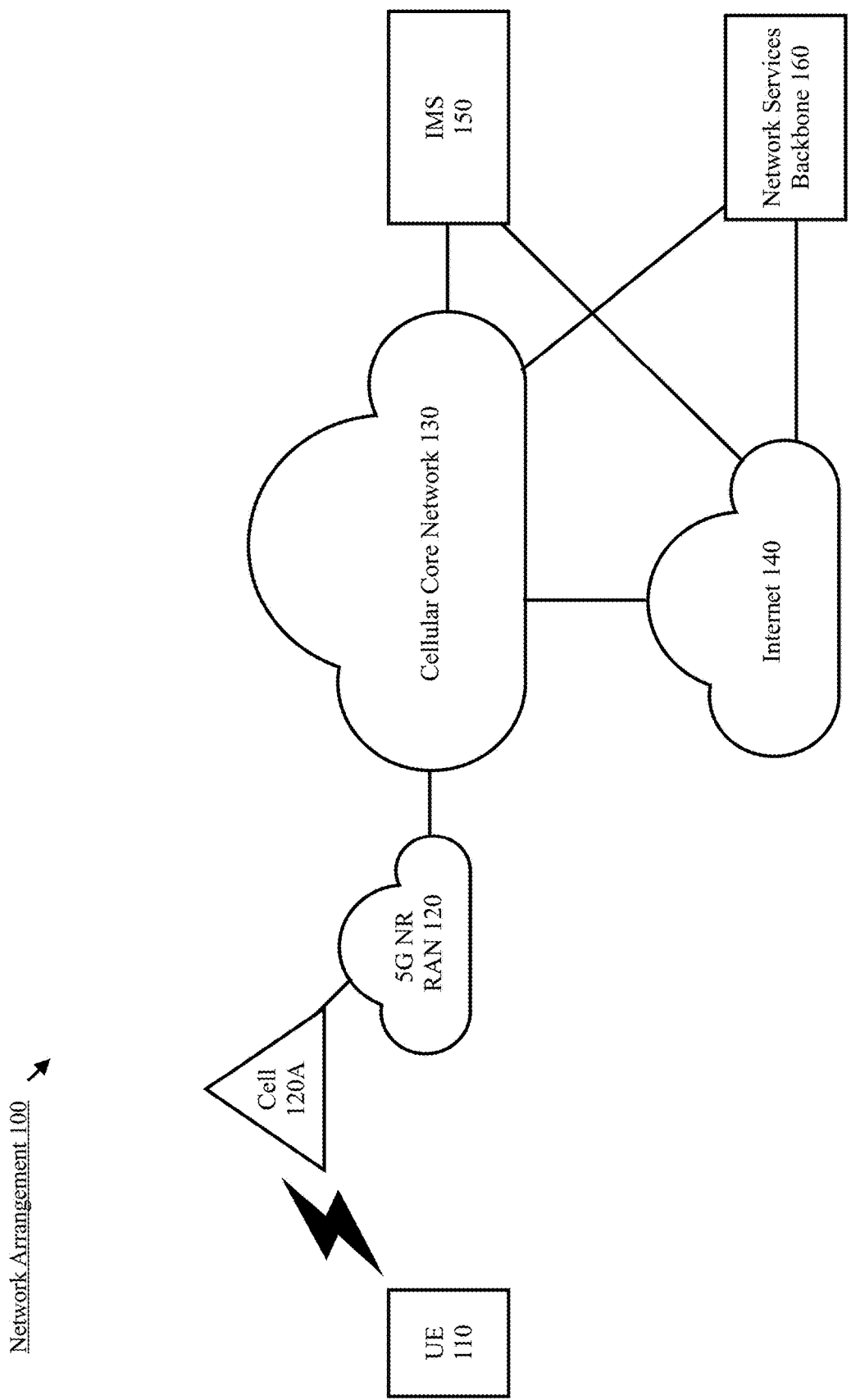
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to implementing a half-duplex (HD) frequency division duplex (FDD) scheme for fifth generation (5G) new radio (NR).

For full duplex (FD) FDD operations, the UE may be configured with multiple carrier frequencies including one or more frequencies to be used for uplink transmissions and one or more frequencies to be used for downlink transmissions. Thus, when FD FDD is enabled, the UE may be capable of simultaneous transmission and reception. In contrast, HD FDD does not support simultaneous transmission and reception at the UE. Instead, when HD FDD is enabled, the UE switches between transmission and reception operations.

There exists a need for mechanisms configured to support "reduced capability NR devices." These types of devices may be characterized as a UE with lower end capabilities (relative to release 16 enhanced mobile broadband (eMBB) devices and ultra-reliable low latency communication (URLLC) devices) configured to serve use cases including, but not limited to, industrial wireless sensors, video surveillance, wearable devices, etc.

One feature of a reduced capability NR device may be HD FDD based communication. However, HD FDD is not yet supported by 5G NR. The exemplary embodiments relate to implementing a HD FDD scheme for 5G NR. While the exemplary embodiments may provide various benefits to reduced capability NR devices, the exemplary embodiments are not limited to these types of devices and may provide benefits to any device configured with HD FDD capabilities. The exemplary embodiments apply to any electronic device configured with HD FDD capabilities. Thus, the UE as described herein may represent any type of electronic device configured to communicate with a network.

For HD FDD operations, it may be beneficial to implement a guard period for downlink and uplink switching where neither downlink reception nor uplink transmissions are expected to occur at the UE. Those skilled in the art will understand that a sufficiently large guard time may mitigate interference between uplink and downlink communications. Throughout this description, the terms "guard period" and "switching gap" may be used interchangeably and shall generally refer to a time duration that occurs subsequent to a downlink or uplink transmission during which neither downlink nor uplink transmissions are expected to occur at the UE.

As mentioned above, the exemplary embodiments relate to implementing a HD FDD scheme for 5G NR. In one aspect, the exemplary embodiments include techniques for enabling and disabling HD FDD at the UE. Enabling HD FDD at the UE may include configuring the guard periods for downlink and uplink switching. In another aspect, the exemplary embodiments include techniques for handling conflicting downlink and uplink operations at the UE. Specific examples of both these exemplary aspects will be described in more detail below. Those skilled in the art will understand that the exemplary embodiments may be used in conjunction with currently implemented HD FDD protocols, future implementations of HD FDD protocols or independently from other HD FDD protocols.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the 5G NR RAN 120.

The 5G NR RAN 120 may be a portion of a cellular network that may be deployed by a network carrier (e.g., Verizon, AT&T, T-Mobile, etc.). The 5G NR RAN 120 may include, for example, cells or base stations (e.g., Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

The UE 110 may connect to the 5G NR RAN 120 via a cell 120A. The cell 120A may include one or more communication interfaces to exchange data and/or information with camped UEs, the 5G NR RAN 120, the cellular core network 130, the internet 140, etc. Further, the cell 120A may include a processor configured to perform various operations. For example, the processor may be configured to perform operations related to enabling HD FDD at the UE 110, configuring the UE 110 with a guard period and communicating with the UE 110 using HD FDD. However, reference to a processor is merely for illustrative purposes. The operations of the cell 120A may also be represented as a separate incorporated component of the cell or may be a modular component coupled to the node, e.g., an integrated circuit with or without firmware. For example, the integrated circuit may include input circuitry to receive signals and processing circuitry to process the signals and other information. In addition, in some cells, the functionality of the processor is split among two or more processors such as a baseband processor and an applications processor. The exemplary embodiments may be implemented in any of these or other configurations of a cell.

It will be further understood that any association procedure may be performed for the UE 110 to connect to the 5G NR RAN 120. For example, as discussed above, the 5G NR RAN 120 may be associated with a particular cellular provider where the UE 110 and/or the user thereof has a contract and credential information (e.g., stored on a SIM card). Upon detecting the presence of the 5G NR RAN 120, the UE 110 may transmit the corresponding credential information to associate with the 5G NR RAN 120. More specifically, the UE 110 may associate with a specific cell or base station. As mentioned above, the use of the 5G NR RAN 120 is for illustrative purposes and any appropriate type of RAN may be used.

In addition to the NR RAN 120, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the EPC and/or the 5GC. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
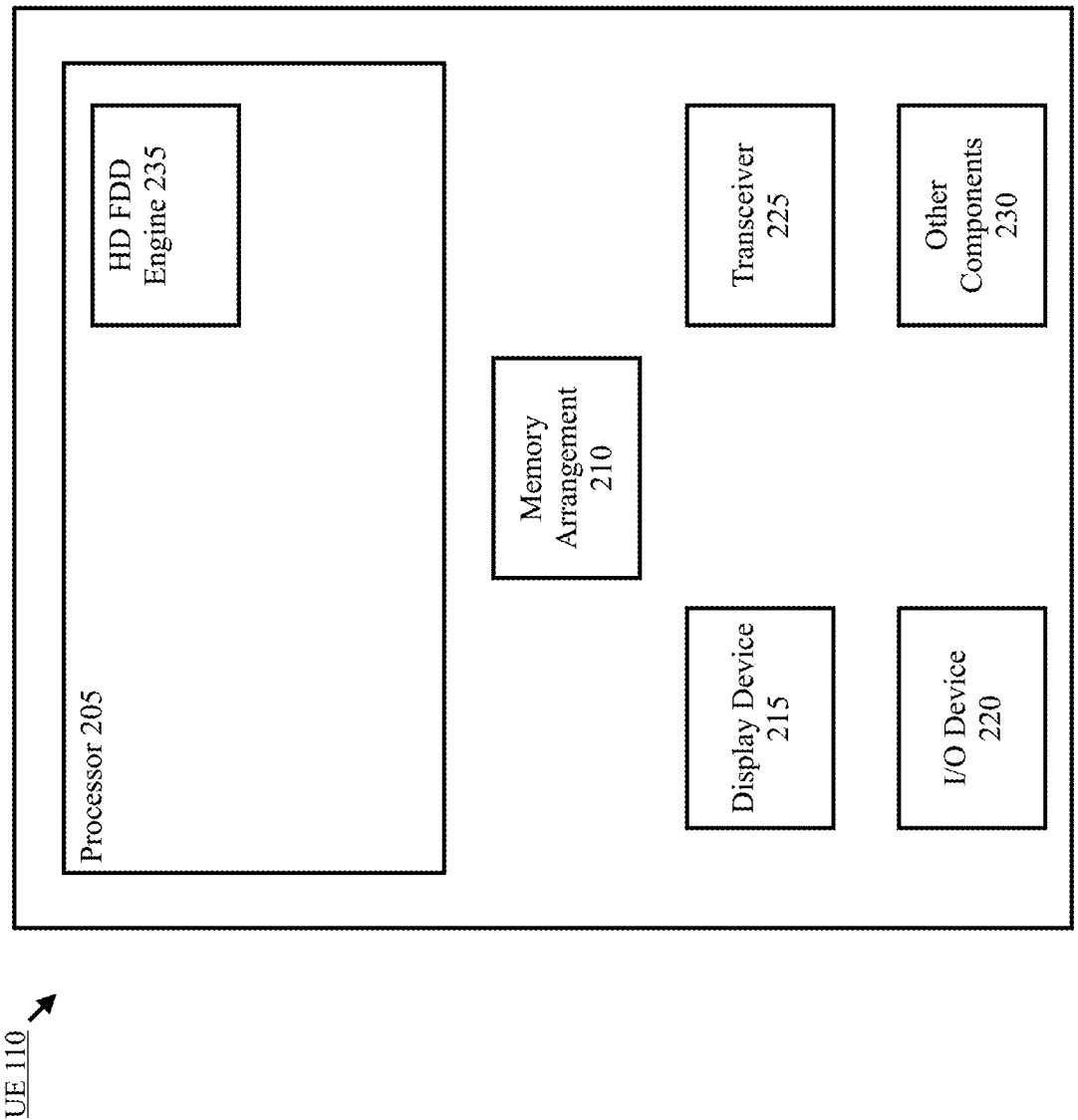
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 2. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include HD FDD engine 235. The HD FDD engine 235 may perform various operations related to HD FDD communication such as, but not limited to, enabling/disabling HD FDD at the UE 110, configuring a guard period, communicating with the network using HD FDD, etc.

The above referenced engine 235 being an application (e.g., a program) executed by the processor 205 is merely provided for illustrative purposes. The functionality associated with the engine 335 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

The exemplary embodiments relate to implementing a HD FDD scheme for 5G NR. In one aspect, the exemplary embodiments include techniques for enabling and disabling HD FDD operations at the UE 110. This may include configuring guard periods for uplink and downlink switching. Specific examples of these exemplary techniques will be described in detail below.

Figure 3:
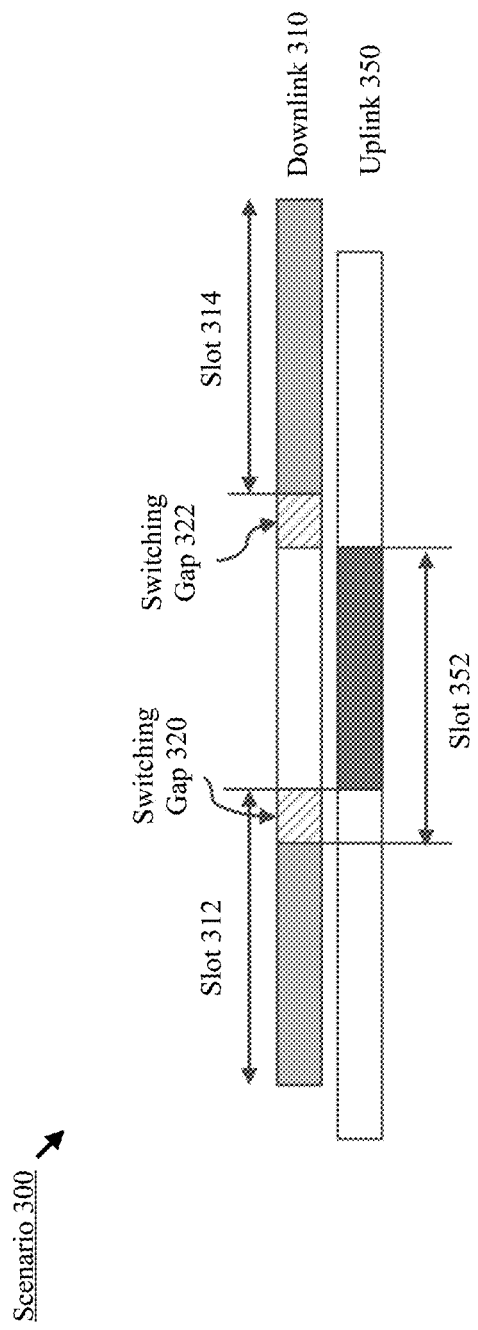
FIG. 3 shows a scenario that illustrates a guard period for downlink and uplink switching according to various exemplary embodiments.

FIG. 3 shows a scenario 300 that illustrates a guard period for downlink and uplink switching according to various exemplary embodiments. The scenario 300 depicts a downlink timeline 310 that represents downlink activity relative to the UE 110 and an uplink timeline 350 that represents uplink activity relative to the UE 110.

In the scenario 300, at a first time, the UE 110 performs operations related to receiving downlink information and/or data during slot 312. At a second time, the UE 110 performs operations related to transmitting uplink information and/or data during slot 352. As mentioned above, when HD FDD is enabled, the UE 110 may not be configured to handle downlink and uplink communications simultaneously. Thus, in the scenario 300, downlink and uplink activity do not overlap in time.

A first switching gap 320 is shown as being located between the downlink transmission of slot 312 and the uplink transmission of slot 352. In some embodiments, the duration of the switching gap 320 between downlink and uplink transmissions is based on the parameter, $N_{RX\text{-}TX}$. During operation, when HD FDD is enabled and the UE 110 is not configured for FD FDD operations, the UE 110 may not expect to transmit in the uplink earlier than $N_{RX\text{-}TX}*T_c$ after the end of the last reception downlink symbol in the same cell where $T_c$ represents a standard time unit (e.g., a sampling rate, etc.). In other words, the UE 110 may operate under the assumption that it is unlikely for the network scheduler to assign uplink resources to the UE 110 during the switching gap 320.

In this example, the downlink resources are shown as overlapping in time with the switching gap 320. This may occur when the time duration between downlink transmission and the uplink transmission is less than the duration of the switching gap 320. Despite this overlap, downlink reception is not performed by the UE 110 during the switching gap 320. Here, reception of the last one or more symbols included in slot 312 may be omitted by the UE 110 to preserve the duration of the switching gap 320 without interfering with the uplink transmission. Examples of other mechanisms that may be implemented by the UE 110 in similar situations are described below.

At a third time, the UE 110 performs operations related to receiving downlink information and/or data during slot 314. A second switching gap 322 is shown as being located between the uplink transmission of slot 352 and the downlink transmission of slot 314. In contrast to the switching gap 320, the switching gap 322 does not overlap with either the uplink or downlink transmissions. This arrangement is illustrated to demonstrate that there may be scenarios in which the guard period does not overlap with either downlink or uplink transmissions.

In some embodiments, the duration of the switching gap 322 between uplink transmission and downlink reception is based on the parameter, $N_{TX\text{-}RX}$. During operation, when HD FDD is enabled and the UE 110 is not configured for FD FDD operations, the UE 110 may not expect to receive in the downlink earlier than $N_{TX\text{-}RX}*T_c$ after the end of the last uplink transmission symbol in the same cell. In other words, the UE 110 may operate under the assumption that it is unlikely for the network scheduler to assign downlink resources to the UE 110 during the switching gap 322.

The scenario 300 is not intended to limit the exemplary embodiments in any way. Instead, this example is merely provided to illustrate the relationship between uplink operations, downlink operations and a switching gap relative to the UE 110. Those skilled in the art will understand how the guard periods may be incorporated into any scenario that includes downlink and uplink switching for HD FDD.

Figure 4:
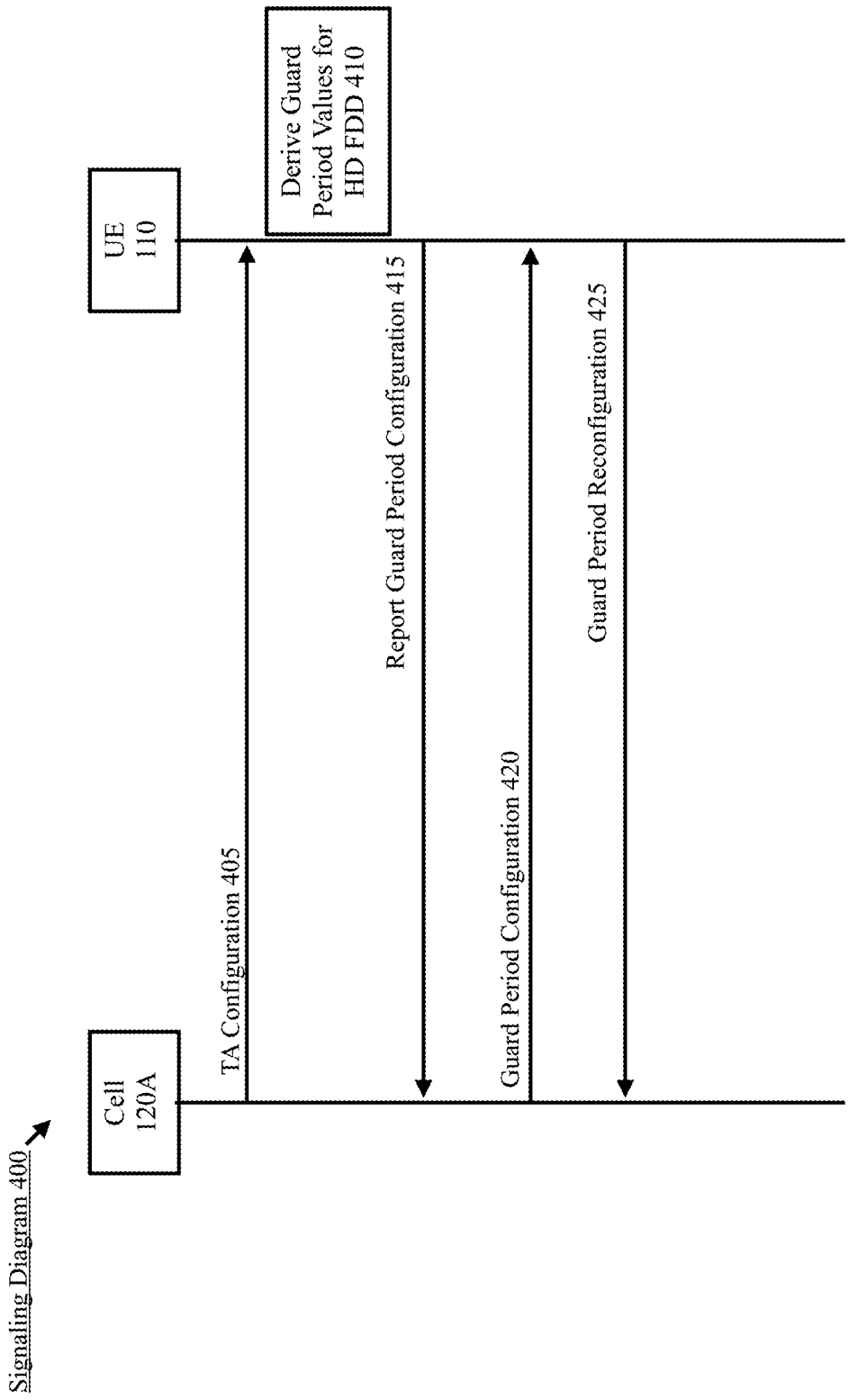
FIG. 4 shows a signaling diagram for enabling half-duplex (HD) frequency division duplex (FDD) at the UE.

FIG. 4 shows a signaling diagram 400 for enabling HD FDD at the UE 110. The signaling diagram 400 will be used to describe a specific example of a signaling exchange between the UE 110 and the cell 120A of the 5G NR RAN 120 that may be used configuring HD FDD guard periods at the UE 110. In addition, alternative techniques and other aspects related to enabling/disabling HD FDD at the UE 110 will be described below relative the signaling diagram 400.

In 405, the cell 120A transmits a timing advance (TA) configuration to the UE 110. Those skilled in the art will understand that TA is a parameter that enables the UE 110 to adjust its uplink transmission timing. This parameter may be signaled to the UE 110 by the network via the cell 120A during an initial access procedure, as a TA update or in any other appropriate manner.

In 410, the UE 110 may derive guard period values for HD FDD. For example, after receiving the TA configuration, the UE 110 may derive a guard period configuration based on the UE 110 specific TA value corresponding to the cell 120A. This may include deriving $N_{TX-RX}$ and/or $N_{RX-TX}$ values.

In some embodiments, the UE 110 may also consider the radio frequency (RF) switching capabilities of the UE 110 when deriving the guard period configuration. For instance, the UE 110 may consider the amount of time that the baseband and/or RF processor needs to execute switching between transmission and reception configurations. However, the exemplary embodiments are not limited to any particular factor providing the basis for this determination. The UE 110 may derive the guard period configuration using any appropriate basis.

In 415, the UE 110 reports the guard period configuration derived in 410. In 420, the cell 120A transmits a signal indicating the guard period configuration for the UE 110. This signal ensures that the UE 110 and the network have a common understanding with regard to when a guard period may occur. In this example, the guard period configuration is based on the information reported by the UE 110. However, in some embodiments, the network may also consider additional UE 110 specific factors and/or network specific factors when configuring the guard periods for the UE 110. Thus, in an actual deployment scenario, the guard period configuration indicated in 420 may be different than the guard period configuration indicated in 415.

Regarding the contents of the signal in 420, in one example, the network may transmit $N_{TX-RX}$ and/or $N_{RX-TX}$ values to the UE 110. In another example, the network may simply indicate that the $N_{TX-RX}$ and/or $N_{RX-TX}$ values reported by the UE 110 in 415 have been accepted.

In some embodiments, the signaling diagram 400 may be repeated every time the UE 110 receives a TA value from the network. In other embodiments, a threshold may be introduced for switching gap reconfiguration.

In 425, the UE 110 reports a guard period reconfiguration. For example, when the UE 110 identifies a change to the TA parameter corresponding to the currently camped serving cell, the UE 110 may compare the new TA value (or a change between an initial TA value and an updated TA value) to a predetermined threshold. In some embodiments, the predetermined threshold may be configured by the network via RRC signaling. When the threshold is satisfied, the UE 110 may be triggered to perform a switching gap reconfiguration procedure. This procedure may include deriving a second different guard period configuration and transmitting a signal including an indication of the second different guard period configuration to the cell 120A.

In some embodiments, the UE 110 may use layer 1 (L1) signaling to trigger the guard period reconfiguration procedure described above. For example, the UE 110 may use a dedicated physical random-access channel (PRACH) resource, a dedicated scheduling request (SR), a radio resource control (RRC) reconfiguration request signaled via the physical uplink shared channel (PUSCH) or any other appropriate uplink resource.

The UE 110 may support both HD FDD and FD FDD operations. During operation, the network may signal the UE 110 to operate with one of these two modes. For example, HD FDD may be enabled at the UE 110 via higher layer signaling. Thus, prior to the establishment of the guard period configuration at the UE 110, the UE 110 may receive a signal (e.g., broadcast system information, a medium access control (MAC) control element (CE), dedicated RRC signaling, etc.) indicating that HD FDD is enabled.

In another example, the UE 110 may be triggered to request HD FDD be enabled based on the TA configuration for the UE 110. Similar to the guard period reconfiguration procedure described above in 425 of the signaling diagram 400, the UE 110 may monitor TA values or a change in TA values. If the TA value or the change in TA values satisfies a threshold, the UE 110 may be triggered to request that HD FDD be enabled. Within the context of the signaling diagram 400, this determination and request may be performed in conjunction with or independently from 410-415 of the signaling diagram 400.

Alternatively, HD FDD operation may be the assumed operation of a particular type of UE 110. For instance, consider a scenario in which the UE 110 supports both HD FDD and FD FDD. During operation, the network may assume that HD FDD is to be used by the UE 110 based on its type. To provide an example, HD FDD operation may be assumed as a default operation mode for redcap UEs. Thus, the network may assume HD FDD operation for the UE 110 if the UE 110 indicates a redcap device type. In this example, the UE 110 may indicate support of FD FDD as part of capability signaling reporting after RRC connection setup is complete. Subsequently, HD FDD may be disabled at the UE 110 via higher layer signaling or any other appropriate type of signaling.

In some embodiments, the switching gap values may be predetermined. For example, $N_{TX-RX}$ and/or $N_{RX-TX}$ values may be defined by the third-generation partnership program (3GPP) standards. In this example, the switching gap values are predetermined and not based on the TA configuration. Since the values are already known by the network and the UE 110, within the context of the signaling diagram 400, the guard period configuration signaling exchange may be simplified to, for example, the signaling exchange depicted by 415-420 or simplified even further to just the signal 415.

Similarly, in some embodiments, a set of switching gap values may be specified for HD FDD. For example, a set of possible $N_{TX-RX}$ and/or $N_{RX-TX}$ values may be defined by the 3GPP standards. The UE 110 may select a particular switching gap value from the set of predetermined switching gap values on any appropriate basis. Since the values are already known by the network and the UE 110, within the context of the signaling diagram 400, the guard period configuration signaling exchange may be simplified to, for example, the signaling exchange depicted by 415-420 or simplified even further to just the signal 415.

When HD FDD is enabled, despite the best efforts of the network and the UE 110, scenarios may occur in which a transmission or reception operation overlaps in time with a guard period. In a first scenario, the time interval between the last symbol of downlink reception and the first symbol of uplink transmission is smaller than the switching gap, e.g., $N_{RX-TX}$*T. In a second scenario, the time interval between the last symbol of uplink transmission and the first symbol of downlink reception is smaller than the switching gap, e.g., $N_{TX-RX}$*T. Specific examples of solutions for both of these scenarios are provided below.

In one embodiment, the UE 110 may prioritize uplink transmission over downlink reception. For example, within the context of the first scenario mentioned above, the UE 110 may be permitted to omit reception of the last symbol or symbols of a downlink transmission. The number of symbols omitted by the UE 110 may be based on the duration of the guard period. During operation, the UE 110 may identify that the guard period overlaps in time with a scheduled downlink resource and a scheduled uplink resource. In response, the UE 110 may omit the last symbol or symbols of the scheduled downlink resources. This maintains the guard period duration $N_{RX-TX}*T$ and mitigates interference with the subsequent uplink transmission.

Similarly, within the context of the second scenario mentioned above, the UE 110 may be permitted to omit reception of the first symbol or symbols of a physical downlink shared channel (PDSCH) reception. The number of symbols omitted by the UE 110 may be based on the duration of the guard period. During operation, the UE 110 may identify that the guard period overlaps in time with a scheduled downlink resource and a scheduled uplink resource. In response, the UE 110 may omit reception of the first symbol or symbols of the PDSCH resources. This maintains the guard period duration $N_{TX-RX}*T$ and mitigates interference with the previous uplink transmission.

In some exemplary embodiments, priority rules for the above referenced scenarios may be defined by the 3GPP standards. For example, certain channels may be prioritized over others. If the UE 110 identifies that a guard period overlaps in time with a downlink resource and an uplink resource, the UE 110 may omit the transmission, reception and/or processing of resources from the channel with the lower assigned priority. A specific example of prioritization groups is provided below, however, the exemplary embodiments are not limited to any particular prioritization mechanism or arrangement of channels.

Consider a scenario in which the following prioritization order is predetermined, e.g., defined by the 3GPP standards. The highest priority is a first priority group which may include PRACH, physical uplink control channel (PUCCH), physical uplink shared channel (PUSCH) and/or aperiodic sounding reference signal (SRS) transmission. The second highest priority is a second priority group which may include physical downlink control channel (PDCCH), physical downlink shared channel (PDSCH), periodic channel state information (CSI) reference signal reception and/or semi-persistent CSI-RS reception. The lowest priority is a third priority group may include periodic and semi-persistent SRS transmission.

In one example, if the UE 110 identifies that a guard period overlaps in time with a resource of a channel included in the first priority group and a resource of a channel included in the second priority group, the UE 110 may omit the resources from the channel in the lower prioritized group (e.g., the second priority group). As mentioned above, the number of symbols or resources omitted may be based on the guard period duration. In another example, if the UE 110 identifies that a guard period overlaps in time with a resource of a channel included in the second priority group and a resource of a channel included in the third priority group, the UE 110 may omit the resources from the channel in the lower prioritized group (e.g., the third priority group).

When HD FDD is enabled, scenarios may occur in which there is a collision between uplink resources and downlink resources. Throughout this description, the term "collision" generally refers to a scenario in which uplink resources overlap in time with downlink resources. When there is a collision the HD FDD UE 110 can only perform one of the overlapped downlink or uplink transmissions since the HD FDD UE 110 cannot perform simultaneous transmission and reception.

Figure 5:
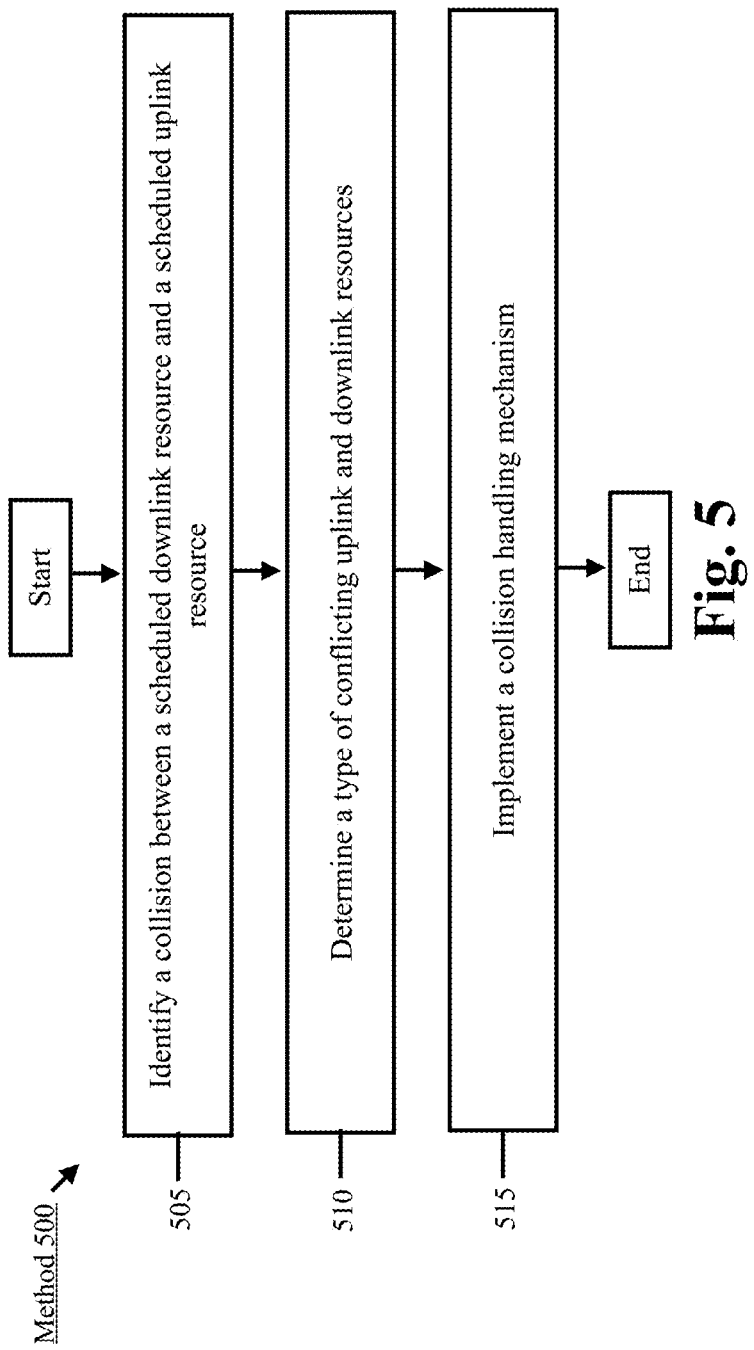
FIG. 5 shows a method for handling a collision at a HD FDD UE according to various exemplary embodiments.

FIG. 5 shows a method 500 for handling a collision at a HD FDD UE according to various exemplary embodiments. The method 500 will be described with regard to the network arrangement 100 of FIG. 1 and the UE 110 of FIG. 2.

In 505, the UE 110 identifies that a collision between an assigned downlink resource and an assigned uplink resource. As will be described in more detail below, the type of conflicting resources may dictate how the UE 110 is to handle the collision.

The following terms may be used throughout this description to further characterize an uplink or downlink resource. The term "semi SFI D" refers to symbols that are indicated as downlink by time division duplex (TDD)-UL-DLConfigCommon control information. Those skilled in the art will understand that SFI refers to a slot format indicator. The term "semi SFI U" refers to the symbols that are indicated as uplink by TDD-UL-DLConfigDedicated control information.

The term "semi SFI F" refers to flexible symbols configured by TDD-UL-DLConfigCommon control information or TDD-UL-DLConfigDedicated control information when provided to the UE 110 or when TDD-UL-DLConfigCommon control information and TDD-UL-DLConfigDedicated control information is not provided to the UE 110.

The term "RRC D" refers to symbols corresponding to a higher-layer configured PDCCH, PDSCH or a CSI-RS on semi SFI F of the same cell. The term "RRC U" refers to symbols corresponding to a higher layer configured SRS, PUCCH, PUSCH or PRACH on semi SFI F of the same cell.

The term "dynamic D" refers to symbols scheduled as downlink by downlink control information (DCI) formats other than DCI format 2_0 on semi SFI F of the same cell. The term "dynamic U" refers to symbols scheduled as uplink by DCI formats other than DCI format 2_0 on semi SFI F of the same cell.

Returning to the method 500, in 510, the UE 110 determines the type of conflicting uplink resources and downlink resources. In 515, the UE 110 may implement a collision handling mechanism based on the type of conflicting uplink and downlink resources. Specific example of the types of collisions and the types of exemplary techniques that may be implemented are provided in detail below.

In one example, when the downlink resources include PDCCH, PDSCH, CSI-RS or a downlink positioning reference signal (PRS) in a set of symbols of a slot including semi SFI D, semi SFI F, or RRC D, and when the uplink resources include PUSCH, PUCCH, PRACH or an SRS transmission on one or more symbols in the set of symbols of these downlink channels, the UE 110 is not required to receive the higher layer configured PDCCH, PDSCH, CSI-RS or the DL PRS on these symbols. Instead of receiving these scheduled resources, the UE 110 may transmit the PUSCH, PUCCH, PRACH, SRS over the dynamic U symbols.

To provide another example, the following options may be considered when the UE 110 detects a collision between periodic SRS, PUCCH for CSI feedback and/or configured grant (CG)-PUSCH on RRC U, semi SFI U and Dynamic D. In a first option, the UE 110 i) does not expect to be configured by higher layers to transmit SRS, PUCCH, PUSCH or PRACH on a flexible or uplink symbol and ii) does not expect to detect DCI format scheduling a reception on the symbols on the downlink frequency.

In a second option, the UE 110 may cancel the SRS, PUCCH, PUSCH or PRACH transmission configured by higher layers if the transmission(s) collide with reception scheduled by DCI format.

Figure 6:
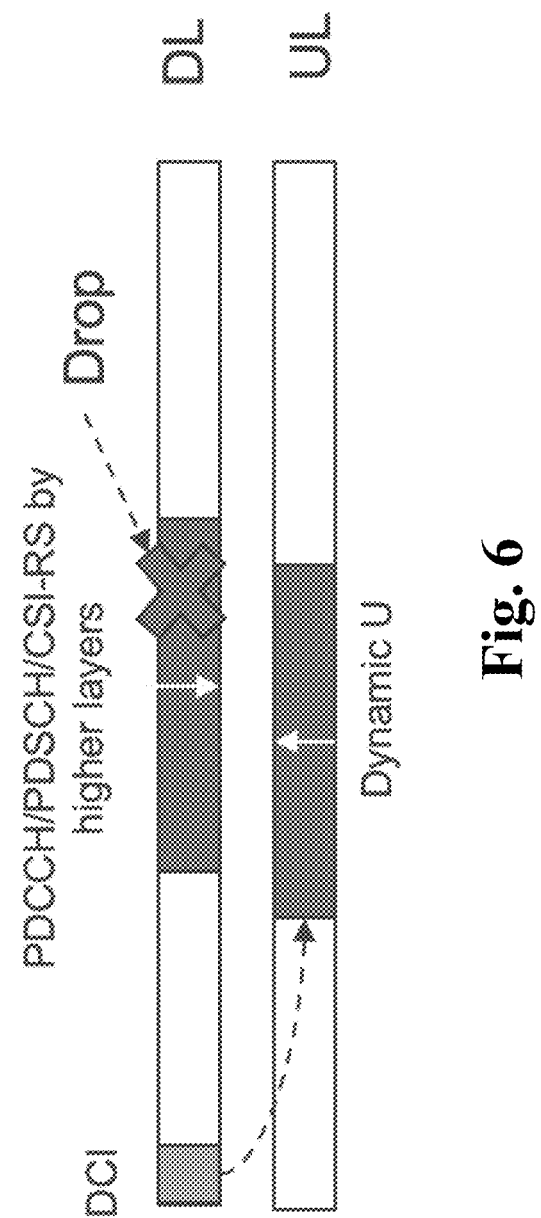
FIG. 6 shows an example of a collision handling mechanism.

In a third option, the UE 110 may drop the SRS, PUCCH, PUSCH or PRACH transmission. An example of this collision handling mechanism is illustrated in FIG. 6.

Figure 7:
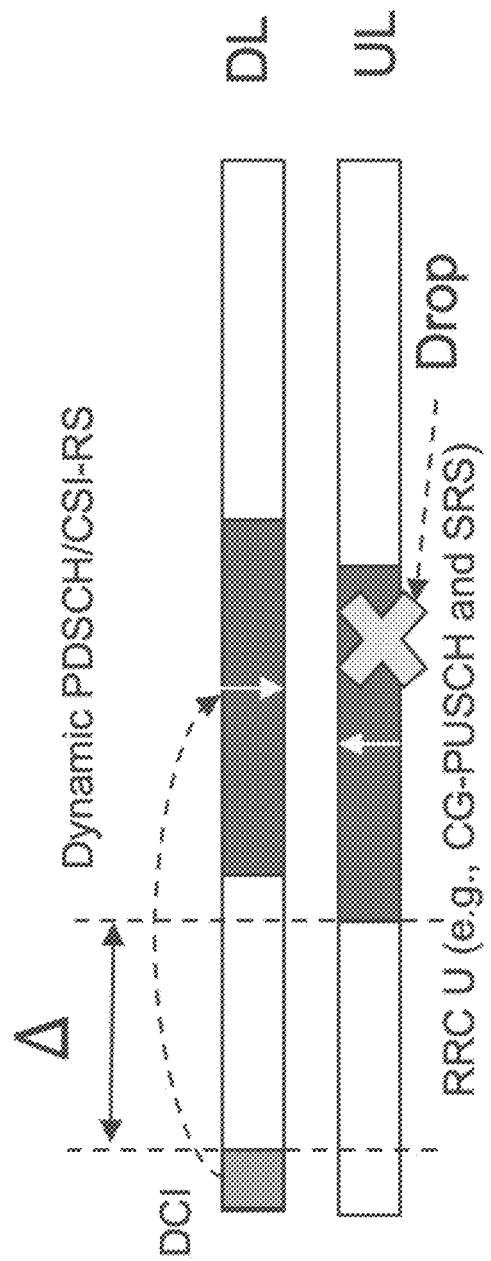
FIG. 7 shows an example of a collision handling mechanism.

In a fourth option, when the timing difference (Δ) between the last symbol of PDCCH conveying DCI format and the first symbol of SRS, PUCCH, PUSCH, PRACH is larger than a predetermined threshold, the UE 110 may drop the SRS, PUCCH, PUSCH, PRACH transmission. Otherwise downlink reception over dynamic D is omitted. An example of this collision handling mechanism is illustrated in FIG. 7.

In another example, when a collision includes RRC U and RRC D resources, the UE 110 may not transmit a PUCCH, PUSCH or PRACH that is configured by higher layers on a set of symbols if at least one symbol from the set of symbols is a symbol corresponding to a PDCCH, PDSCH or CSI-RS reception that is configured by higher layers. Instead, the UE 110 may receive the PDCCH, PDSCH or CSI-RS configured by higher layer on these symbols.

Figure 8:
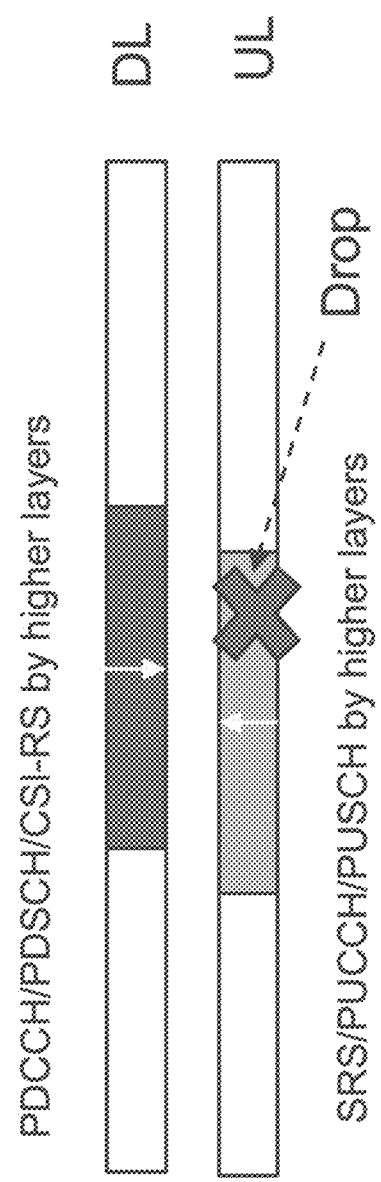
FIG. 8 shows an example of a collision handling mechanism.

In some embodiments, the PDCCH, PDSCH or CSI-RS may be dropped when PUCCH is used for SR transmission or CG-PUSCH is associated with a higher priority. Otherwise, the SRS, PUCCH, PUSCH configured by higher layers may be dropped. An example of this collision handling mechanism is illustrated in FIG. 8.

In another example, the UE 110 may not expect to detect a first DCI format scheduling a transmission on the uplink and a second DCI format scheduling a reception on a downlink symbol.

EXAMPLES

In a first example, a user equipment comprising a transceiver configured to communicate with a network and a processor communicatively coupled to the transceiver and configured to perform operations is provided. The operations comprise determining that half-duplex (HD) frequency division duplex (FDD) is enabled by a network with which the UE is communicating, wherein a guard period is configured for downlink and uplink switching when the HD FDD is enabled, performing a first uplink transmission at a first time and performing a first downlink reception at a second time, wherein the guard period represents a time duration between the first time and the second time during which the UE is not to perform a second different uplink transmission or a second different downlink reception.

In a second example, the UE of the first example, wherein the operations further comprise receiving a timing advance (TA) configuration from a serving cell.

In a third example, the UE of the second example, wherein the operations further comprise deriving a value for the guard period based on the TA configuration and reporting the guard period to the serving cell.

In a fourth example, the UE of the third example, wherein the operations further comprise receiving a guard period configuration from the serving cell in response to reporting the guard period.

In a fifth example, the UE of the first example, wherein the operations further comprise initiating a guard period reconfiguration procedure based on comparing one of a timing advance (TA) value or a change in TA values to a predetermined threshold, wherein initiating the guard period reconfiguration procedure includes transmitting at least one of a scheduling request (SR), a physical random access channel (PRACH) resource or a reconfiguration request on a physical uplink shared channel (PUSCH).

In a sixth example, the UE of the first example, wherein the UE is equipped with HD FDD capabilities and full duplex (FD) FDD capabilities and wherein determining that HD FDD is enabled is based on receiving a signal from a serving cell.

In a seventh example, the UE of the first example, wherein the UE is equipped with HD FDD capabilities and full duplex (FD) FDD capabilities and wherein determining that HD FDD is enabled is based on a timing advance (TA) configuration.

In an eighth example, the UE of the first example, wherein the operations further comprise transmitting an indication of a device type for the UE to the network, wherein the device type indicates that the UE is configured for HD FDD operations.

In a ninth example, the UE of the first example, wherein the operations further comprise reporting a guard period configuration to a serving cell, wherein the guard period configuration includes a predetermined value for the guard period.

In a tenth example, the UE of the first example, wherein the operations further comprise reporting a guard period configuration to a serving cell, wherein the guard period configuration includes a value for the guard period that is selected by the UE from a set of predetermined values.

In an eleventh example, the UE of the first example, wherein the operations further comprise identifying that a time interval between a last symbol of the first downlink transmission and a first symbol of the first uplink transmission is smaller than the guard period and omitting the reception of one or more symbols included in the first downlink transmission based on the identifying.

In a twelfth example, the UE of the first example, wherein the operations further comprise identifying that a time interval between a last symbol of the first uplink transmission and a first symbol of the first downlink reception is smaller than the guard period and omitting the reception of one or more symbols included in the first downlink reception based on the identifying.

In a thirteenth example, the UE of the first example, wherein the operations further comprise identifying that a time interval between the first downlink reception and the first uplink transmission is smaller than the guard period, determining a first priority associated with the first downlink reception and a second priority the first uplink transmission and omitting the downlink reception or uplink transmission or one or more symbols based on the first priority and the second priority.

In a fourteenth example, a user equipment comprising a transceiver configured to communicate with a network and a processor communicatively coupled to the transceiver and configured to perform operations is provided. The operations comprise determining that half-duplex (HD) frequency division duplex (FDD) is enabled by the network with which the UE is communicating, identifying a collision between an assigned downlink resource and an assigned uplink resource, determining a type of downlink resource and a type of uplink resource included in the collision and implementing a collision handling mechanism based on the type of downlink resource and the type of uplink resource included in the collision.

In a fifteenth example, the UE of the fourteenth example, wherein the operations further comprise when the downlink resource is in a slot that includes semi slot format indictor (SFI) downlink resources, semi SFI flexible resources or radio resource control (RRC) downlink resources and when the uplink resource is scheduled by downlink control information (DCI), the collision handling mechanism includes performing an uplink transmission on the uplink resource and omitting the downlink reception on the downlink resource.

In a sixteenth example, the UE of the fourteenth example, wherein the collision includes a dynamic downlink resource.

In a seventeenth example, the UE of the fourteenth example, wherein the collision handling mechanism includes cancelling an uplink transmission on the uplink resource.

In an eighteenth example, the UE of the fourteenth example, wherein the operations further comprise determining a timing difference between a last symbol of a physical downlink control channel (PDCCH) including downlink control information (DCI) and a first symbol of an uplink resource is larger than a predetermined threshold and dropping a scheduled uplink transmission based on the timing difference being larger than the predetermined threshold.

In a nineteenth example, the UE of the fourteenth example, wherein the operations further comprise determining a timing difference between a last symbol of a physical downlink control channel (PDCCH) including downlink control information (DCI) and a first symbol of an uplink resource is smaller than a predetermined threshold and omitting a downlink transmission based on the timing difference being smaller than the predetermined threshold.

In a twentieth example, the UE of the fourteenth example, wherein the collision includes radio resource control (RRC) uplink resources and RRC downlink resources, wherein the RRC downlink resources correspond to one of a physical downlink control channel (PDCCH), physical downlink shared channel (PDSCH) or a channel state information (CSI)-reference signal (RS)reception that is configured by higher layers, and wherein the collision handling mechanism includes receiving a downlink transmission on the downlink resource and omitting an uplink transmission on the uplink resource.

In a twenty first example, the UE of the fourteenth example, wherein the collision includes radio resource control (RRC) uplink resources and RRC downlink resources, when the RRC uplink resources correspond to one of a scheduling request transmission or a configured grant (CG)-physical uplink shared channel (PUSCH), the collision handling mechanism includes performing an uplink transmission and omitting a downlink reception, and when the RRC uplink resources does not correspond to one of the scheduling request transmission or the CG-PUSCH, the collision handling mechanism includes performing the downlink reception and dropping the uplink transmission.

In a twenty second example, a base station comprising a transceiver configured to communicate with a user equipment (UE) and a processor communicatively coupled to the transceiver and configured to perform operations is provided. The operation comprise transmitting a timing advance (TA) configuration to the UE, wherein the TA configuration is to be used by the UE to derive a guard period for downlink and uplink switching at the UE receiving an indication of the guard period from the UE, determining that half-duplex (HD) frequency division duplex (FDD) is enabled at the UE, performing a first uplink reception at a first time and performing a first downlink transmission at a second time wherein the guard period represents a time duration in between the first time and the second time during which the base station is not to perform a second different uplink transmission or a second different downlink transmission.

In a twenty third example, the base station of the twenty second example, wherein the operations further comprise transmitting guard period configuration information to the UE in response to the indication of the guard period.

In a twenty fourth example, the base station of the twenty second example, wherein the operations further comprise receiving guard period reconfiguration information from the UE, wherein the UE initiates a guard period reconfiguration procedure based on comparing one of a timing advance (TA) value or a change in TA values to a predetermined threshold, and wherein the guard period reconfiguration information is included in one of a scheduling request (SR), a physical random access channel (PRACH) resource or a reconfiguration request on a physical uplink shared channel (PUSCH).

In a twenty fifth example, the base station of the twenty second example, wherein determining that HD FDD is enabled at the UE is based on receiving an indication of a device type from the UE.

In a twenty sixth example, the base station of the twenty second example, wherein the operations further comprise identifying that the UE is equipped with HD FDD capabilities and full duplex (FD) FDD capabilities and transmitting a signal to the UE indicated that HD FDD is enabled.

In a twenty seventh example, the base station of the twenty sixth example, wherein the signal is one of a dedicated radio resource control (RRC) signal, broadcast system information or a medium access control (MAC) control element (CE).

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A processor of a user equipment (UE) configured to perform operations comprising:
    determining that half-duplex (HD) frequency division duplex (FDD) is enabled by a fifth generation (5G) new radio (NR) network with which the UE is communicating, wherein a guard period is configured for downlink and uplink switching when the HD FDD is enabled;

performing a first uplink transmission at a first time to a base station of the 5G NR network;
performing a first downlink reception at a second time to the base station of the 5G NR network, wherein the guard period represents a time duration between the first time and the second time during which the UE is not to perform a second different uplink transmission or a second different downlink reception with the base station of the 5G NR network; and
initiating a guard period reconfiguration procedure, wherein initiating the guard period reconfiguration procedure includes deriving a second guard period and transmitting an indication of the second guard period to the base station of the 5G NR network using a dedicated physical random access channel (PRACH) resource.

2. The processor of claim 1, wherein the operations further comprise:
receiving a timing advance (TA) configuration from a serving cell.

3. The processor of claim 2, wherein the operations further comprise:
deriving a value for the guard period based on the TA configuration; and
reporting the guard period to the serving cell.

4. The processor of claim 3, wherein the operations further comprise:
receiving a guard period configuration from the serving cell in response to reporting the guard period.

5. The processor of claim 1, wherein the operations further comprise:
initiating the guard period reconfiguration procedure based on comparing one of a timing advance (TA) value or a change in TA values to a predetermined threshold).

6. The processor of claim 1, wherein the UE is equipped with HD FDD capabilities and full duplex (FD) FDD capabilities and wherein determining that HD FDD is enabled is based on receiving a signal from a serving cell.

7. The processor of claim 1, wherein the UE is equipped with HD FDD capabilities and full duplex (FD) FDD capabilities and wherein determining that HD FDD is enabled is based on a timing advance (TA) configuration.

8. The processor of claim 1, wherein the operations further comprise:
transmitting an indication of a device type for the UE to the network, wherein the device type indicates that the UE is configured for HD FDD operations.

9. The processor of claim 1, wherein the operations further comprise:
reporting a guard period configuration to a serving cell, wherein the guard period configuration includes a predetermined value for the guard period.

10. The processor of claim 1, wherein the operations further comprise:
reporting a guard period configuration to a serving cell, wherein the guard period configuration includes a value for the guard period that is selected by the UE from a set of predetermined values.

11. The processor of claim 1, wherein the operations further comprise:
identifying that a time interval between a last symbol of the first downlink transmission and a first symbol of the first uplink transmission is smaller than the guard period; and
omitting the reception of one or more symbols included in the first downlink transmission based on the identifying.

12. The processor of claim 1, wherein the operations further comprise:
identifying that a time interval between a last symbol of the first uplink transmission and a first symbol of the first downlink reception is smaller than the guard period; and
omitting the reception of one or more symbols included in the first downlink reception based on the identifying.

13. The processor of claim 1, wherein the operations further comprise:
identifying that a time interval between the first downlink reception and the first uplink transmission is smaller than the guard period;
determining a first priority associated with the first downlink reception and a second priority the first uplink transmission; and
omitting the downlink reception or uplink transmission or one or more symbols based on the first priority and the second priority.

14. A method comprising:
at a user equipment (UE):
determining that half-duplex (HD) frequency division duplex (FDD) is enabled by a fifth generation (5G) new radio (NR) network with which the UE is communicating, wherein a guard period is configured for downlink and uplink switching when the HD FDD is enabled;
performing a first uplink transmission at a first time to a base station of the 5G NR network;
performing a first downlink reception at a second time to the base station of the 5G NR network, wherein the guard period represents a time duration between the first time and the second time during which the UE is not to perform a second different uplink transmission or a second different downlink reception with the base station of the 5G NR network; and
initiating a guard period reconfiguration procedure, wherein initiating the guard period reconfiguration procedure includes deriving a second guard period and transmitting an indication of the second guard period to the base station of the 5G NR network using a dedicated physical random access channel (PRACH) resource.

15. The method of claim 14, further comprising:
receiving a timing advance (TA) configuration from a serving cell.

16. The method of claim 15, further comprising:
deriving a value for the guard period based on the TA configuration; and
reporting the guard period to the serving cell.

17. The method of claim 16, further comprising:
receiving a guard period configuration from the serving cell in response to reporting the guard period.

18. The method of claim 14, further comprising:
initiating the guard period reconfiguration procedure based on comparing one of a timing advance (TA) value or a change in TA values to a predetermined threshold.

* * * * *